(12) United States Patent
Grestenberger et al.

(10) Patent No.: US 10,647,838 B2
(45) Date of Patent: May 12, 2020

(54) HETEROPHASIC PROPYLENE COPOLYMER WITH LOW SHRINKAGE

(71) Applicant: BOREALIS AG, Vienna (AT)

(72) Inventors: Georg Grestenberger, St. Peter in der Au (AT); Daniela Mileva, Pichling (AT); Susanne Kahlen, Leonding (AT); Pavel Shutov, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 16/070,113

(22) PCT Filed: Jan. 27, 2017

(86) PCT No.: PCT/EP2017/051718
§ 371 (c)(1),
(2) Date: Jul. 13, 2018

(87) PCT Pub. No.: WO2017/129721
PCT Pub. Date: Aug. 3, 2017

(65) Prior Publication Data
US 2019/0031869 A1 Jan. 31, 2019

(30) Foreign Application Priority Data
Jan. 29, 2016 (EP) .................................... 16153368

(51) Int. Cl.
| | | |
|---|---|---|
| *C08L 23/12* | (2006.01) | |
| *C08F 2/00* | (2006.01) | |
| *C08F 210/06* | (2006.01) | |
| *C08L 23/14* | (2006.01) | |

(52) U.S. Cl.
CPC .............. *C08L 23/12* (2013.01); *C08F 2/001* (2013.01); *C08F 210/06* (2013.01); *C08L 23/142* (2013.01); *C08F 2500/12* (2013.01); *C08F 2500/17* (2013.01); *C08F 2800/10* (2013.01); *C08L 2205/02* (2013.01); *C08L 2207/02* (2013.01); *C08L 2207/04* (2013.01)

(58) Field of Classification Search
None
See application file for complete search history.

(56) References Cited

FOREIGN PATENT DOCUMENTS

| | | | |
|---|---|---|---|
| EP | 0887379 | A1 | 12/1998 |
| EP | 2154194 | A1 | 2/2010 |
| EP | 2426171 | A1 | 3/2012 |
| EP | 2610271 | A1 | 7/2013 |
| EP | 2610272 | A1 | 7/2013 |
| EP | 2610273 | A1 | 7/2013 |
| RU | 2520448 | C2 | 6/2014 |
| WO | 1992/12182 | A1 | 7/1992 |
| WO | 1999/24478 | A1 | 5/1999 |
| WO | 1999/24479 | A1 | 5/1999 |
| WO | 2000/068315 | A1 | 11/2000 |
| WO | 2004/000899 | A1 | 12/2003 |
| WO | 2004/111095 | A1 | 12/2004 |
| WO | 2008/061843 | A1 | 5/2008 |
| WO | 2010/142540 | A1 | 12/2010 |
| WO | 2012/007430 | A1 | 1/2012 |
| WO | 2013/010877 | A1 | 1/2013 |
| WO | 2013/150057 | A1 | 10/2013 |
| WO | WO 2015/004251 | * | 1/2015 |

OTHER PUBLICATIONS

Zweifel, et al., "Plastics Additives Handbook", 5th Edition, Department of Materials, Institute of Polymers, 2001.
Zhou et al., "A new decoupling method for accurate quantification of polyethylene copolymer composition and triad sequence distribution with 13C NMR", Journal of Magnetic Resonance 187 (2007) pp. 225-233.
Wang et al., "Structural Analysis of Ethylene/Propylene Copolymers Synthesized with a Constrained Geometry Catalyst", Macromolecules 2000, 33, pp. 1157-1162.
Singh et al., "Triad sequence determination of ethylene-propylene copolymers—application of quantitative 13C NMR", Polymer Testing 28 (2009) pp. 475-479.
Resconi et al., "Selectivity in Propene Polymerization with Metallocene Catalysts", Chem. Rev. 2000, 100, pp. 1253-1345.
Kakugo et al., "13C NMR Determination of Monomer Sequence Distribution in Ethylene-Propylene Copolymers Prepared with d-TiC13-Al(C2H5)2C1" Macromolecules 1982, 15, pp. 1150-1152.
H.N. Cheng, "13C NMR Analysis of Ethylene-Propylene Rubbers", Macromolecules 1984, 17, 1950-1955.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.
Russian Office action for Patent Application No. 2018127515/04, dated Apr. 24, 2019.

* cited by examiner

*Primary Examiner* — Ana L. Woodward
(74) *Attorney, Agent, or Firm* — Tarolli, Sundheim, Covell & Tummino LLP

(57) ABSTRACT

A heterophasic propylene copolymer (HECO) comprising a polypropylene matrix having a melt flow rate $MFR_2$ (230° C.) in the range of 40 to 120 g/10 min and a comonomer content in the range of 30 to 75 mol-% for the preparation of molded articles with low CLTE.

11 Claims, No Drawings

HETEROPHASIC PROPYLENE COPOLYMER WITH LOW SHRINKAGE

The present invention is directed to a new heterophasic propylene copolymer with low shrinkage.

In the automotive industry there is recent demand towards weight reduction and improvement in dimensional stability of the final parts. Accordingly various automotive applications such as bumper or door claddings are made out of advanced polypropylene materials. These polypropylene materials are usually heterophasic polypropylene propylene copolymers, where a (semi)crystalline polypropylene forms the continuous phase in which an elastomeric propylene copolymer is dispersed.

Shrinkage of bigger automobile parts is very detrimental. Accordingly there is a strong demand in the automobile industry to find polymer components with low shrinkage characteristic. For instance a reduction of shrinkage below 0.8% is nowadays desired. Further also a very low coefficient of thermal expansion is of high interest when plastics are combined with metals. One of the traditional concepts for reducing these parameters is to add a second component such as inorganic filler or plastomer. However, higher concentrations of inorganic fillers are not desirable due to weight increase and external elastomer can be very costly. Beside the good dimensional stability, the ductile behavior at cold temperatures and high stiffness at ambient conditions are other necessary requirements for an advanced heterophasic propylene copolymer materials. Fulfillment of the complete thermo-mechanical and dimensional-stability material profile has always remained a challenge due to the antagonistic effects of the particular properties.

Thus the object of the present invention is to provide a new heterophasic propylene copolymer having a low shrinkage, a low coefficient of linear thermal expansion and at the same time preserving good mechanical properties like high impact strength.

SUMMARY OF THE INVENTION

Accordingly the present invention is directed in a $1^{st}$ embodiment to a heterophasic propylene copolymer (HECO) comprising
(a) a (semi)crystalline polypropylene (PP) having a melt flow rate $MFR_2$ (230° C.) measured according to ISO 1133 in the range of 40 to 120 g/10 min, and
(b) an elastomeric propylene copolymer (ESC) dispersed in said (semi)crystalline polypropylene (PP),
wherein said heterophasic propylene copolymer (HECO) has
(i) a xylene cold soluble (XCS) fraction in the range of 22 to 64 wt.-%, preferably in the range of 25 to 64 wt.-%, more preferably in the range of 28 to 64 wt.-%;
(ii) a comonomer content in the range of 28.0 to 75.0 mol-%; and
(iii) a melt flow rate $MFR_2$ (230° C.) measured according to ISO 1133 in the range of 15 to 70 g/10 min.

Preferably the intrinsic viscosity (IV) of the xylene cold insoluble (XCI) fraction of the heterophasic propylene copolymer (HECO) of the $1^{st}$ embodiment is in the range of 1.05 to 1.45 dl/g.

In one specific $1^{st}$ emboiment the heterophasic propylene copolymer (HECO) comprises
(a) a (semi)crystalline polypropylene (PP) having a melt flow rate $MFR_2$ (230° C.) measured according to ISO 1133 in the range of 40 to 120 g/10 min; and
(b) an elastomeric propylene copolymer (ESC) dispersed in said (semi)crystalline polypropylene (PP)
wherein said heterophasic propylene copolymer (HECO) has
(i) a xylene cold soluble (XCS) fraction in the range of 22 to 64 wt.-%, preferably in the range of 25 to 64 wt.-%, more preferably in the range of 28 to 64 wt.-%;
(ii) a comonomer content in the range of 30.0 to 75.0 mol-%; and
(iii) a melt flow rate $MFR_2$ (230° C.) measured according to ISO 1133 in the range of 15 to 70 g/10 min and
wherein further the intrinsic viscosity (IV) of the xylene cold soluble (XCS) fraction of said heterophasic propylene copolymer (HECO) is in the range of 1.30 to 2.20 dl/g and preferably the intrinsic viscosity (IV) of the xylene cold insoluble (XCI) fraction of the heterophasic propylene copolymer (HECO) of the $1^{st}$ embodiment is in the range of 1.05 to 1.45 dl/g.

In a $2^{nd}$ embodiment the present invention is directed to a heterophasic propylene copolymer (HECO) comprising
(a) a (semi)crystalline polypropylene (PP); and
(b) an elastomeric propylene copolymer (ESC) dispersed in said (semi)crystalline polypropylene (PP)
wherein said heterophasic propylene copolymer (HECO) has
(i) a xylene cold soluble (XCS) fraction in the range of 22 to 64 wt.-%, preferably in the range of 25 to 64 wt.-%, more preferably in the range of 28 to 64 wt.-%;
(ii) a comonomer content in the range of 28.0 to 75.0 mol-%; and
(iii) a melt flow rate $MFR_2$ (230° C.) measured according to ISO 1133 in the range of 15 to 70 g/10 min,
and wherein further
(iv) the xylene cold insoluble (XCI) fraction of the heterophasic propylene copolymer (HECO) has an intrinsic viscosity (IV) in the range of 1.05 to 1.45 dl/g.

Preferably the (semi)crystalline polypropylene (PP) of the heterophasic propylene copolymer (HECO) of the $2^{nd}$ embodiment has a melt flow rate $MFR_2$ (230° C.) measured according to ISO 1133 in the range of 40 to 120 g/10 min.

The following preferred embodiments apply to the $1^{st}$ and $2^{nd}$ embodiments as defined above.

Preferably the xylene cold soluble (XCS) fraction of the heterophasic propylene copolymer (HECO) has a comonomer content, preferably ethylene content, in the range of 40.0 to 75.0 mol-% and/or the heterophasic propylene copolymer (HECO) complies with the in equation (1)

$$\frac{C2\ (XCS)}{C2\ (T)} \leq 2.5 \quad (1)$$

wherein
C2 (XCS) is the comonomer content, preferably ethylene content, of the xylene cold soluble (XCS) fraction [in mol % of the xylene cold soluble (XCS) fraction];
C2 (T) is the comonomer content, preferably the ethylene content, of heterophasic propylene copolymer (HECO) [in mol % of the heterophasic propylene copolymer (HECO)].

More preferably the comonomers of the heterophasic propylene copolymer (HECO) are ethylene and/or a $C_4$ to $C_8$ α-olefin and/or the comonomers of the xylene cold soluble (XCS) fraction of the heterophasic propylene copolymer (HECO) are ethylene and/or a $C_4$ to $C_8$ α-olefin.

In a preferred embodiment the xylene cold soluble (XCS) fraction of the heterophasic propylene copolymer (HECO)

has an intrinsic viscosity (IV) in the range of 1.20 to 2.00 dl/g and/or the heterophasic propylene copolymer (HECO) complies with the in-equation (2)

$$\frac{MFR(M)}{MFR(T)} \leq 5.0 \tag{3}$$

wherein

MFR (M) is the melt flow rate MFR$_2$ (230° C.) measured according to ISO 1133 (g/10 min) of the (semi)crystalline polypropylene (PP);

MFR (T) is the melt flow rate MFR$_2$ (230° C.) measured according to ISO 1133 (g/10 min) of the heterophasic propylene copolymer (HECO).

Still more preferably the heterophasic propylene copolymer (HECO) complies with the in equation (2)

$$0.80 \leq \frac{IV(XCS)}{IV(XCI)} \leq 2.00 \tag{2}$$

wherein

IV (XCS) is the intrinsic viscosity (IV) [dl/g] of the xylene cold soluble (XCS) fraction of the heterophasic propylene copolymer (HECO), and IV (XCI) is the intrinsic viscosity (IV) [dl/g] of the xylene cold insoluble (XCI) fraction of the heterophasic propylene copolymer (HECO).

It is further preferred that the (semi)crystalline polypropylene (PP) is a (semi)crystalline propylene homopolymer (H-PP) preferably having a xylene cold soluble (XCS) fraction of less than 4.5 wt.-% and/or the elastomeric propylene copolymer (ESC) is an ethylene propylene rubber (EPR).

It is especially preferred that the heterophasic propylene copolymer (HECO) according to this invention has (a) an impact strength at +23° C. of at least 10 kJ/m$^2$;
and/or
(b) a coefficient of linear thermal expansion (CLTE) performed in a temperature range from −30 to +80° C. of not more than 92 μm/mK;
and/or
(c) a shrinkage in flow (60×60×2 mm) of below 0.50%;
and/or
(d) a shrinkage across flow (60×60×2 mm) of below 0.70%.

The invention is further directed to an automotive article comprising a heterophasic propylene copolymer (HECO) according to this invention, wherein preferably the automotive article is an exterior automotive article.

Additionally the invention is further directed to a process for the preparation of the heterophasic propylene copolymer (HECO) according to this invention wherein the heterophasic propylene copolymer (HECO) is obtained by producing the (semi)crystalline polypropylene (PP) in a first reaction zone comprising at least one reactor, transferring said (semi)crystalline polypropylene (PP) into a subsequent reaction zone comprising at least one reactor, where in the presence of the (semi)crystalline polypropylene (PP) the elastomeric propylene copolymer (ESC) is produced.

In the following the invention is defined in more detail.

The Heterophasic Propylene Copolymer (HECO)

The heterophasic propylene copolymer (HECO) according to this invention comprises a (semi)crystalline polypropylene (PP) as a matrix in which an elastomeric propylene copolymer (ESC) is dispersed. The expression "heterophasic propylene copolymer" or "heterophasic" as used in the instant invention indicates that the elastomeric propylene copolymer (ESC) is (finely) dispersed in the (semi)crystalline polypropylene (PP). In other words the (semi)crystalline polypropylene (PP) constitutes a matrix in which the elastomeric propylene copolymer (ESC) forms inclusions in the matrix, i.e. in the (semi)crystalline polypropylene (PP). Thus the matrix contains (finely) dispersed inclusions being not part of the matrix and said inclusions contain the elastomeric propylene copolymer (ESC). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

The heterophasic propylene copolymer (HECO) has a melt flow rate MFR$_2$ (230° C., 2.16 kg) in the range of 15 to 70 g/10 min, more preferably in the range of 18 to 50 g/10 min, yet more preferably in the range of 18 to 40 g/10 min.

In one embodiment the heterophasic propylene copolymer (HECO) has (a) an impact strength at +23° C. of at least 10 kJ/m$^2$, more preferably in the range of 10 to 60 kJ/m$^2$, like in the range of 10 to 55 kJ/m$^2$.
and/or
(b) an impact strength at −20° C. of at least 4 kJ/m$^2$, more preferably in the range of 4 to 60 kJ/m$^2$, like in the range of 4 to 55 kJ/m$^2$.

In one specific embodiment the heterophasic propylene copolymer (HECO) has (a) a shrinkage in flow (60×60×2 mm) of below 0.50%, more preferably in the range of 0 to 0.50%, yet more preferably in the range of 0 to 0.30%, still more preferably in the range of 0 to 0.25%;
and/or
(b) a shrinkage across flow (60×60×2 mm) of below 0.70%, more preferably in the range of 0 to 0.70%, yet more preferably in the range of 0 to 0.65%, still more preferably in the range of 0 to 0.60%.

Additionally or alternatively to the previous paragraph the heterophasic propylene copolymer (HECO) according to this invention has a coefficient of linear thermal expansion (CLTE) performed in a temperature range from −30 to +80° C. of not more than 92 μm/mK, more preferably in the range of 40 to 92 μm/mK, yet more preferably in the range of 50 to 90 μm/mK, like in the range of 55 to 88 μm/mK.

As mentioned above, the heterophasic propylene copolymer (HECO) according to this invention preferably comprises (a) a (semi)crystalline polypropylene (PP) as the matrix (M) and
(b) an elastomeric propylene copolymer (ESC).

Preferably the weight ratio between the (semi)crystalline polypropylene (PP) and the elastomeric propylene copolymer (ESC) [PP/ESC] of the heterophasic propylene copolymer (HECO) is in the range of 75/25 to 45/55, more preferably in the range of 70/30 to 48/52, yet more preferably in the range of 66/34 to 49/51.

The heterophasic propylene copolymer (HECO) according to this invention has a comonomer content, preferably a content of ethylene and/or C$_4$ to C$_{12}$ α-olefin, more preferably an ethylene content, in the range of 25.0 to 75.0 mol.-%, e.g. in the range of 28.0 to 70.0 mol.-%, more preferably in the range of 30.0 to 75.0 mol.-%, still more preferably in the range of 28.0 to 65.0 mol-%, yet more preferably in the range of 30.0 to 60.0 mol.-%, like 30.0 to 55.0 mol-%.

Further, the heterophasic propylene copolymer (HECO) according to this invention has a xylene cold soluble (XCS) fraction (25° C.) in the range of 22 to 64 wt.-%, preferably in the range of 25 to 64 wt.-%, more preferably in the range of 28 to 64 wt.-%, still more preferably in the range of 29 to 60 wt.-%, yet more preferably in the range of 30 to 55 wt.-%.

The comonomer content, preferably the content of ethylene and/or $C_4$ to $C_{12}$ α-olefin, more preferably the content of ethylene, of the xylene cold soluble fraction (XCS) of the heterophasic propylene copolymer (HECO) is in the range of 35.0 to 75.0 mol-%, preferably in the range of 40.0 to 75.0 mol.-%, more preferably in the range of 45.0 to 73.0 mol.-%, more preferably in the range of 48.0 to 65.0 mol-%.

Accordingly it is preferred that the heterophasic propylene copolymer (HECO) complies with the inequation (1), more preferably with in-equation (1a), still more preferably with in equation (1b), yet more preferably with in-equation (1c), $$\frac{C2\ (XCS)}{C2\ (T)} \leq 2.5 \tag{1}$$

$$1.0 \leq \frac{C2\ (XCS)}{C2\ (T)} \leq 2.5 \tag{1a}$$

$$1.2 \leq \frac{C2\ (XCS)}{C2\ (T)} \leq 2.4 \tag{1b}$$

$$1.4 \leq \frac{C2\ (XCS)}{C2\ (T)} \leq 2.3 \tag{1c}$$

wherein

C2 (XCS) is the comonomer content, preferably the content of ethylene and/or $C_4$ to $C_{12}$ α-olefin, more preferably the content of ethylene, of the xylene cold soluble (XCS) fraction [in mol % of the xylene cold soluble (XCS) fraction];

C2 (T) is the comonomer content, preferably the content of ethylene and/or $C_4$ to $C_{12}$ α-olefin, more preferably the content of ethylene, of heterophasic propylene copolymer (HECO) [in mol % of the heterophasic propylene copolymer (HECO)].

The intrinsic viscosity (IV) of the xylene cold soluble fraction (XCS) of the heterophasic propylene copolymer (HECO) is in the range of 1.20 to 2.70 dl/g, preferably in the range 1.30 to 2.20 dl/g, more preferably in the range of 1.30 to 1.90 dl/g. In a especially preferred embodiment the intrinsic viscosity (IV) of the xylene cold soluble fraction (XCS) of the heterophasic propylene copolymer (HECO) is in the range of 1.20 to 2.00 dl/g, preferably in the range 1.30 to 1.90 dl/g, more preferably in the range of 1.30 to 1.80 dl/g.

Further it is preferred that the xylene insoluble fraction (XCI) of the heterophasic propylene copolymer (HECO) has an intrinsic viscosity (IV) in the range of 1.05 to 1.45 dl/g, more preferably in the range of 1.10 to 1.42 dl/g, still more preferably in the range of 1.15 to 1.41 dl/g.

Accordingly it is preferred that the heterophasic propylene copolymer (HECO) complies with the inequation (2), more preferably with in-equation (2a), still more preferably with in equation (2b), yet more preferably with in-equation (2c)

$$0.80 \leq \frac{IV\ (XCS)}{IV\ (XCI)} \leq 2.00 \tag{2}$$

-continued $$0.85 \leq \frac{IV\ (XCS)}{IV\ (XCI)} \leq 1.80 \tag{2a}$$

$$0.90 \leq \frac{IV\ (XCS)}{IV\ (XCI)} \leq 1.70 \tag{2b}$$

$$0.91 \leq \frac{IV\ (XCS)}{IV\ (XCI)} \leq 1.60 \tag{2c}$$

wherein

IV (XCS) is the intrinsic viscosity (IV) [dl/g] of the xylene cold soluble (XCS) fraction of the heterophasic propylene copolymer (HECO), and IV (XCI) is the intrinsic viscosity (IV) [dl/g] of the xylene cold insoluble (XCI) fraction of the heterophasic propylene copolymer (HECO).

The (semi)crystalline polypropylene (PP) is preferably a (semi)crystalline random propylene copolymer (R-PP) or a (semi)crystalline propylene homopolymer (H-PP), the latter especially preferred.

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

In case the (semi)crystalline polypropylene (PP) is a (semi)crystalline random propylene copolymer (R-PP) it is appreciated that the (semi)crystalline random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP) according to this invention comprises, especially consists of, monomers co-polymerizable with propylene from the group consisting of ethylene, 1-butene and 1-hexene. More specifically the (semi)crystalline random propylene copolymer (R-PP) of this invention comprises—apart from propylene—units derivable from ethylene and/or 1-butene. In a preferred embodiment the (semi)crystalline random propylene copolymer (R-PP) comprises units derivable from ethylene and propylene only.

Additionally it is appreciated that the (semi)crystalline random propylene copolymer (R-PP) has preferably a co-monomer content in the range of more than 0.30 to 3.0 mol-%, more preferably in the range of more than 0.35 to 2.5 mol-%, yet more preferably in the range of 0.40 to 2.0 mol-%.

The term "random" indicates in the present invention that the co-monomers of the (semi)crystalline random propylene copolymers are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semi)crystalline polypropylene (PP) and the elastomeric propylene copolymer (ESC). However, it is preferred that the heterophasic propylene copolymer (HECO) is produced in a sequential step process, using reactors in serial configuration and operating at different reaction conditions. Typically the (semi)crystalline polypropylene (PP) is produced in a first reactor system comprising at least one reactor and subsequently the elastomeric propylene copolymer (EC) in a second reactor system comprising at least one reactor.

According to this invention the (semi)crystalline polypropylene (PP), like (semi)crystalline propylene homopolymer (H-PP), has a melt flow rate $MFR_2$ (230° C.) measured according to ISO 1133 of 40 to 120 g/10 min, more preferably of 41 to 110 g/10 min, still more preferably of 42 to 110 g/10 min, like in the range of 44 to 95 g/10 min.

Accordingly it is preferred that the heterophasic propylene copolymer (HECO) complies with the in-equation (3), more preferably with in-equation (3a), still more preferably with in equation (3b), yet more preferably with in-equation (3c), $$\frac{MFR\ (M)}{MFR\ (T)} \leq 5.0 \tag{3}$$

$$1.0 \leq \frac{MFR\ (M)}{MFR\ (T)} \leq 5.0 \tag{3a}$$

$$1.2 \leq \frac{MFR\ (M)}{MFR\ (T)} \leq 4.0 \tag{3b}$$

$$1.3 \leq \frac{MFR\ (M)}{MFR\ (T)}\ 3.5 \tag{3c}$$

wherein

MFR (M) is the melt flow rate $MFR_2$ (230° C.) measured according to ISO 1133 (g/10 min) of the (semi)crystalline polypropylene (PP);

MFR (T) is the melt flow rate $MFR_2$ (230° C.) measured according to ISO 1133 (g/10 min) of the heterophasic propylene copolymer (HECO).

The term "(semi)crystalline" indicates in the present invention that the polymer is not amorphous. Accordingly it is preferred that the (semi)crystalline polypropylene (PP) according to this invention has a xylene soluble fraction (XCS) of not more than 10 wt.-%, in case of a (semi)crystalline propylene homopolymer (H-PP) the xylene soluble fraction (XCS) is even lower, i.e. not more than 6.0 wt, more preferably not more than 4.5 wt.-%, like not more than 3.5 wt.-%.

Accordingly it is preferred that the (semi)crystalline propylene homopolymer (H-PP) has a xylene soluble fraction (XCS) of below 5.0 wt.-%, more preferably in the range of 0.5 to 4.5, like in the range of 1.0 to 2.8 wt.-%.

The second component of the heterophasic propylene copolymer (HECO) is the elastomeric propylene copolymer (ESC).

Preferably said elastomeric propylene copolymer (EC) comprises units derived from propylene and ethylene and/or $C_4$ to $C_{12}$ α-olefin.

The elastomeric propylene copolymer (ESC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (ESC) may additionally contain units derived from a conjugated diene, like butadiene, or a non-conjugated diene, however it is preferred that the elastomeric propylene copolymer (ESC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly the elastomeric propylene copolymer (ESC) comprises at least units derivable from propylene and ethylene and may comprise other units derivable from a further α-olefin as defined in the previous paragraph. However, it is in particular preferred that elastomeric propylene copolymer (ESC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (ESC) is especially preferred, the latter most preferred.

As mentioned above the heterophasic propylene copolymer (HECO) can be produced by blending the (semi)crystalline polypropylene (PP) and the elastomeric propylene copolymer (ESC). However, it is preferred that the heterophasic propylene copolymer (HECO) is produced in a sequential step process, using for instance reactors in serial configuration and operating at different reaction conditions. As a consequence, each fraction prepared in a specific reactor may have its own molecular weight distribution and/or comonomer content distribution.

Accordingly the heterophasic propylene copolymer (HECO) can be produced in one reactor under different conditions, e.g. first under bulk conditions and subsequently under gaseous conditions. The reactor can be for instance a batch reactor.

The heterophasic propylene copolymer (HECO) can be also obtained by producing the (semi)crystalline polypropylene (PP) in a first reaction zone comprising at least one reactor, transferring said (semi)crystalline polypropylene (PP) into a subsequent reaction zone comprising at least one reactor, where in the presence of the (semi)crystalline polypropylene (PP) the elastomeric propylene copolymer (ESC) is produced.

Thus according to one embodiment the heterophasic propylene copolymer (HECO) according to this invention is produced in a sequential polymerization process, i.e. in a multistage process, known in the art, wherein the (semi)crystalline polypropylene (PP) is produced at least in one slurry reactor, preferably in a slurry reactor and optionally in a subsequent gas phase reactor, and subsequently the elastomeric propylene copolymer (ESC) is produced at least in one, i.e. one or two, gas phase reactor(s).

Accordingly it is preferred that the heterophasic propylene copolymer (HECO) is produced in a polymerization process comprising the steps of (a) polymerizing propylene and optionally at least one ethylene and/or $C_4$ to $C_{12}$ α-olefin in a reactor under bulk conditions obtaining the (semi)crystalline polypropylene (PP), preferably the (semi)crystalline propylene homopolymer (H-PP), (b) polymerizing in said reactor under gas phase conditions and in the presence of said (semi)crystalline polypropylene (PP) propylene and at least one ethylene and/or $C_4$ to $C_{12}$ α-olefin obtaining thereby the elastomeric propylene copolymer (ESC), wherein the elastomeric propylene copolymer (ESC) is dispersed in the (semi)crystalline polypropylene (PP), i.e. obtaining thereby the heterophasic propylene copolymer (HECO).

Alternatively the heterophasic propylene copolymer (HECO) is produced in a sequential polymerization process comprising the steps of
(a) polymerizing propylene and optionally at least one ethylene and/or $C_4$ to $C_{12}$ α-olefin in a first reactor (R1) reactor obtaining the (semi)crystalline polypropylene (PP), preferably the (semi)crystalline propylene homopolymer (H-PP),
(b) transferring the (semi)crystalline polypropylene (PP) into a second reactor (R2),
(c) polymerizing in the second reactor (R2) and in the presence of said (semi)crystalline polypropylene (PP) propylene and at least one ethylene and/or $C_4$ to $C_{12}$ α-olefin obtaining thereby the elastomeric propylene copolymer (ESC), wherein the elastomeric propylene copolymer (ESC) is dispersed in the (semi)crystalline polypropylene (PP), i.e. obtaining thereby the heterophasic propylene copolymer (HECO).

Alternatively the heterophasic propylene copolymer (HECO) can be produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semi) crystalline polypropylene (PP), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (PP), i.e. the matrix of the heterophasic propylene copolymer (HECO),
(d) transferring the (semi)crystalline polypropylene (PP) of step (c) into a third reactor (R3),
(e) polymerizing in the third reactor (R3) and in the presence of the (semi)crystalline polypropylene (PP) obtained in step (c) propylene and at least one ethylene and/or $C_4$ to $C_{12}$ α-olefin obtaining thereby the first elastomeric fraction of the elastomeric propylene copolymer (ESC),
(f) transferring the (semi)crystalline polypropylene (PP) and the first elastomeric fraction of the elastomeric propylene copolymer (ESC) of step (e) into a fourth reactor (R4),
(g) polymerizing in the fourth reactor (R4) and in the presence of the (semi)crystalline polypropylene (PP) and the first elastomeric fraction a second fraction of the elastomeric propylene copolymer (ESC) obtaining thereby the elastomeric propylene copolymer (ESC) being dispersed in the (semi)crystalline polypropylene (PP), i.e. obtaining thereby the heterophasic propylene copolymer (HECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (HECO) is produced in at least two, like two, three or four reactors connected in series. Accordingly the present process comprises at least a first reactor (R1) and a second reactor (R2), more preferably a first reactor (R1) and a second reactor (R2) or a first reactor (R1), a second reactor (R2) and a third reactor (R3) or a first reactor (R1), a second reactor (R2), a third reactor (R3) and fourth reactor (R4). The term "polymerization reactor" shall indicate that the main polymerization takes place. Thus in case the process consists of two, three or four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a stirred bulk batch reactor or a (bulk) loop reactor (LR).

The second reactor (R2) can be a slurry reactor, like a loop reactor, as the first reactor or alternatively a gas phase reactor (GPR).

The third reactor (R3) and fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 msec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

The same conditions are applied in case the heterophasic propylene copolymer (HECO) is produced in one reactor, like a batch reactor, for the preparation of the polypropylene (PP).

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar, hydrogen can be added for controlling the molar mass in a manner known per se.

The same conditions are applied in case the heterophasic propylene copolymer (HECO) is produced in one reactor, like a batch reactor, for the preparation of the elastomeric propylene copolymer (ESC).

The condition in the third reactor (R3), preferably in the second gas phase reactor (GPR-2), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 1.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 10 to 100 bar, for example 12 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system.

As pointed out above in the specific process for the preparation of the heterophasic propylene copolymer (HECO) as defined above, a specific Ziegler-Natta catalyst (ZN-C) can be used. Accordingly, the Ziegler-Natta catalyst (ZN-C) will be now described in more detail.

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of a)
 $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)-solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R''(OH)$_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like TiCl$_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 g/m$^2$, more preferably below 10 g/m$^2$. Typically the amount of Ti is 1 to 6 wt-%, Mg 10 to 20 wt-% and donor 10 to 40 wt-% of the catalyst composition.

Detailed description of preparation of catalysts is disclosed in WO 2012/007430, EP2610271, EP 261027 and EP2610272 which are incorporated here by reference.

The Ziegler-Natta catalyst (ZN-C) is preferably used in association with an alkyl aluminum cocatalyst and optionally external donors.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $$R^a_p R^b_q Si(OR^c)_{(4-p-q)}$$

wherein $R^a$, $R^b$ and $R^c$ denote a hydrocarbon radical, in particular an alkyl or cycloalkyl group, and wherein p and q are numbers ranging from 0 to 3 with their sum p+q being equal to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$^2$, (phenyl)$_2$Si(OCH$_3$)$_2$ and (cyclopentyl)$_2$Si(OCH$_3$)$_2$, or of general formula $$Si(OCH_2CH_3)_3(NR^3R^4)$$

wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the cyclohexylmethyl dimethoxy silane donor (C-Donor) or the pentyl dimethoxy silane donor (D-donor), the latter especially preferred.

In addition to the Ziegler-Natta catalyst (ZN-C) and the optional external donor (ED) a co-catalyst can be used. The co-catalyst is preferably a compound of group 13 of the periodic table (IUPAC), e.g. organo aluminum, such as an aluminum compound, like aluminum alkyl, aluminum halide or aluminum alkyl halide compound. Accordingly, in one specific embodiment the co-catalyst (Co) is a trialkyl-aluminium, like triethylaluminium (TEAL), dialkyl aluminium chloride or alkyl aluminium dichloride or mixtures thereof. In one specific embodiment the co-catalyst (Co) is triethylaluminium (TEAL).

Advantageously, the triethyl aluminium (TEAL) has a hydride content, expressed as $AlH_3$, of less than 1.0 wt % with respect to the triethyl aluminium (TEAL). More preferably, the hydride content is less than 0.5 wt %, and most preferably the hydride content is less than 0.1 wt %.

Preferably the ratio between the co-catalyst (Co) and the external donor (ED) [Co/ED] and/or the ratio between the co-catalyst (Co) and the transition metal (TM) [Co/TM] should be carefully chosen.

Accordingly, (a) the mol-ratio of co-catalyst (Co) to external donor (ED) [Co/ED] must be in the range of 5 to 45, preferably is in the range of 5 to 35, more preferably is in the range of 5 to 25; and optionally (b) the mol-ratio of co-catalyst (Co) to titanium compound (TC) [Co/TC] must be in the range of above 80 to 500, preferably is in the range of 100 to 450, still more preferably is in the range of 120 to 350.

Additives (AD)

The heterophasic propylene copolymer (HECO) may contain additives (AD). Typical additives are acid scavengers, antioxidants, colorants, light stabilisers, plasticizers, slip agents, anti-scratch agents, dispersing agents, processing aids, lubricants, pigments, and the like.

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the heterophasic propylene copolymer (HECO) of the invention does not comprise (a) further polymer (s) different to the polypropylene (PP) and the elastomeric propylene copolymer (ESC) in an amount exceeding 15 wt.-%, preferably in an amount exceeding 10 wt.-%, more preferably in an amount exceeding 8 wt.-%, based on the weight of the heterophasic propylene copolymer (HECO). If an additional polymer is present, such a polymer is typically a polyethylene being a side product of the preparation of the elastomeric propylene copolymer (ESC) or a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the heterophasic propylene copolymer (HECO) of the invention. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The heterophasic propylene copolymer (HECO) of the present invention is preferably used for the production of articles, more preferably of moulded articles, yet more preferably of injection moulded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive heterophasic propylene copolymer (HECO). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive heterophasic propylene copolymer (HECO).

Considering the above information the present invention is in particular directed to the following embodiments:

[1] Heterophasic propylene copolymer (HECO) comprising (a) a (semi)crystalline polypropylene (PP) having a melt flow rate $MFR_2$ (230° C.) measured according to ISO 1133 in the range of 40 to 120 g/10 min; and (b) an elastomeric propylene copolymer (ESC) dispersed in said (semi)crystalline polypropylene (PP)

wherein said heterophasic propylene copolymer (HECO) has (i) a xylene cold soluble (XCS) fraction in the range of 22 to 64 wt.-%;

(ii) a comonomer content in the range of 28.0 to 75.0 mol-%; and (iii) a melt flow rate $MFR_2$ (230° C.) measured according to ISO 1133 in the range of 15 to 70 g/10 min.

[2] Heterophasic propylene copolymer (HECO) according to paragraph [1], wherein the intrinsic viscosity (IV) of the xylene cold insoluble (XCI) fraction of the heterophasic propylene copolymer (HECO) is in the range of 1.05 to 1.45 dl/g.

[3] Heterophasic propylene copolymer (HECO) comprising
(a) a (semi)crystalline polypropylene (PP); and
(b) an elastomeric propylene copolymer (ESC) dispersed in said (semi)crystalline polypropylene (PP)
wherein said heterophasic propylene copolymer (HECO) has
(i) a xylene cold soluble (XCS) fraction in the range of 22 to 64 wt.-%;
(ii) a comonomer content in the range of 28.0 to 75.0 mol-%; and
(iii) a melt flow rate MFR$_2$ (230° C.) measured according to ISO 1133 in the range of 15 to 70 g/10 min,
and wherein further
(iv) the xylene cold insoluble (XCI) fraction of the heterophasic propylene copolymer (HECO) has an intrinsic viscosity (IV) in the range of 1.05 to 1.45 dl/g.

[4] Heterophasic propylene copolymer (HECO) according to paragraph [3], wherein the (semi)crystalline polypropylene (PP) has a melt flow rate MFR$_2$ (230° C.) measured according to ISO 1133 in the range of 40 to 120 g/10 min.

[5] Heterophasic propylene copolymer (HECO) according to any one of the paragraphs [1] to [4], wherein the xylene cold soluble (XCS) fraction of the heterophasic propylene copolymer (HECO) has a comonomer content, preferably ethylene content, in the range of 40.0 to 75.0 mol-%.

[6] Heterophasic propylene copolymer (HECO) according to any one of the paragraphs [1] to [5], wherein the comonomers of the heterophasic propylene copolymer (HECO) are ethylene and/or a $C_4$ to $C_8$ α-olefin and/or the comonomers of the xylene cold soluble (XCS) fraction of the heterophasic propylene copolymer (HECO) are ethylene and/or a $C_4$ to $C_8$ α-olefin, preferably ethylene.

[7] Heterophasic propylene copolymer (HECO) according to any one of the paragraphs [1] to [6], wherein
(a) the xylene cold soluble (XCS) fraction of the heterophasic propylene copolymer (HECO) has an intrinsic viscosity (IV) in the range of 1.20 to 2.00 dl/g, and/or
(b) the heterophasic propylene copolymer (HECO) complies with the in-equation (2)

$$0.80 \leq \frac{IV\ (XCS)}{IV\ (XCI)} \leq 2.00 \qquad (2)$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

[8] Heterophasic propylene copolymer (HECO) according to any one of the paragraphs [1] to [7] complying with the inequation (1)

$$\frac{C2\ (XCS)}{C2\ (T)} \leq 2.5 \qquad (1)$$

wherein
C2 (XCS) is the comonomer content, preferably ethylene content of the xylene cold soluble (XCS) fraction [in mol % of the xylene cold soluble (XCS) fraction];

C2 (T) is the comonomer content, preferably ethylene content, of heterophasic propylene copolymer (HECO) [in mol % of the heterophasic propylene copolymer (HECO)]

[9] Heterophasic propylene copolymer (HECO) according to any one of the paragraphs [1] to [8] complying with the in-equation (3)

$$\frac{MFR\ (M)}{MFR\ (T)} \leq 5.0 \qquad (3)$$

wherein
MFR (M) is the melt flow rate MFR$_2$ (230° C.) measured according to ISO 1133 (g/10 min) of the (semi)crystalline polypropylene (PP);
MFR (T) is the melt flow rate MFR$_2$ (230° C.) measured according to ISO 1133 (g/10 min) of the heterophasic propylene copolymer (HECO).

[10] Heterophasic propylene copolymer (HECO) according to any one of the paragraphs [1] to [9], wherein the (semi)crystalline polypropylene (PP) is a (semi)crystalline propylene homopolymer (H-PP) preferably having a xylene cold soluble (XCS) fraction of less than 4.5 wt.-%.

[11] Heterophasic propylene copolymer (HECO) according to any one of the paragraphs [1] to [10], wherein the elastomeric propylene copolymer (ESC) is an ethylene propylene rubber (EPR).

[12] Heterophasic propylene copolymer (HECO) according to any one of the paragraphs [1] to [11] having
(a) impact strength at +23° C. of at least 10 kJ/m$^2$
and/or
(b) a coefficient of linear thermal expansion (CLTE) performed in a temperature range from −30 to +80° C. of not more than 92 μm/mK.

[13] Heterophasic propylene copolymer (HECO) according to any one of the paragraphs [1] to [12] having
(a) a shrinkage in flow (60×60×2 mm) of below 0.50%, and/or
(b) a shrinkage across flow (60×60×2 mm) of below 0.70%.

[14] Automotive article comprising a heterophasic propylene copolymer (HECO) according to any one of the paragraphs [1] to [13], wherein preferably the automotive article is an exterior automotive article.

[15] Process for the preparation of the heterophasic propylene copolymer (HECO) according to any one of the paragraphs [1] to [13] wherein the heterophasic propylene copolymer (HECO) is obtained by producing the (semi) crystalline polypropylene (PP) in a first reaction zone comprising at least one reactor, transferring said (semi)crystalline polypropylene (PP) in a subsequent reaction zone comprising at least one reactor, where in the presence of the (semi)crystalline polypropylene (PP) the elastomeric propylene copolymer (ESC) is produced.

The invention will be further defined by way of examples.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-d2) along with chromium-(III)-acetylacetonate (Cr(acac)3) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J. Talarico, G., Macromol. Rapid Commun. 2007, 28, 1128). A total of 6144 (6k) transients were acquired per spectra.

Quantitative $^{13}C$ {$^{1}H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2.1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^{1}H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol \%}]=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

$MFR_2$ (230° C.) is measured according to ISO 1133 (230° C., 2.16 kg load).

Xylene cold soluble fraction (XCS wt.-%): Content of xylene cold solubles (XCS) is determined at 25° C. according ISO 16152; first edition; 2005-07-01. The part which remains insoluble is the xylene cold insoluble (XCI) fraction.

Intrinsic viscosity is measured according to DIN ISO 1628/1, October 1999 (in Decalin at 135° C.).

The flexural modulus was determined in 3-point-bending according to ISO 178 on 80×10×4 mm$^3$ test bars injection molded at 23° C. in line with EN ISO 1873-2.2.

Charpy notched impact strength is determined according to ISO 180/1A at 23° C. and at −20° C. by using injection moulded test specimens as described in EN ISO 1873-2 (80×10×4 mm).

Coefficient of linear thermal expansion: The coefficient of linear thermal expansion (CLTE) was determined in accordance with ISO 11359-2:1999 on 10 mm long pieces cut from the core of the same injection molded specimens as used for the flexural modulus determination The measurement was performed in a temperature range from −30 to +80° C. at a heating rate of 1° C./min and in a temperature range from 23 to +80° C. at a heating rate of 1° C./min, respectively.

Shrinkage measurement on quadratic plaques: Shrinkage was determined on injection moulded quadratic plaques (60×60×2 mm). The film gated specimens were moulded on an Engel V60 injection moulding machine, equipped with a small (Ø 22 mm; L/D=20) screw according to EN ISO 1873-2. Process parameters were 200° C. melt temperature, 100 mm/s flow front velocity, holding pressure time 10 seconds, hydraulic holding pressure level 10 bar. After a time span of at least 96 h after demoulding the dimensions (length and width) of the plaques were measured and compared to the dimensions of the cavity at room temperature.

Polymerization of Comparative HECO CE1

Catalyst Preparation:

The catalyst used in the polymerization processes was the commercial ZN104 of Basell with triethyl-aluminium (TEAl) as co-catalyst and dicyclo pentyl dimethoxy silane (donor D) as donor.

The Al/donor ratio was 5 mol/mol, and the Al/Ti ratio was 200 mol/mol. A Borstar PP pilot plant comprised of a stirred-tank prepolymerization reactor (R1), a liquid-bulk loop reactor (R2) and three gas phase reactors (R3 to R5)

was used for the main polymerization. The resulting polymer powders were compounded in a co-rotating twin-screw extruder Coperion ZSK 57 at 220° C. with 0.2 wt.-% of Irganox B225 (1:1-blend of Irganox 1010 (Pentaerythrityl-tetrakis(3-(3',5'-di-tert.butyl-4-hydroxytoluyl)-propionate and tris (2,4-di-t-butylphenyl) phosphate) phosphite) of BASF AG, Germany) and 0.05 wt.-% calcium stearate.

TABLE 1a

Polymerization of comperative HECO CE1 (Part 1)

|  |  | CE1 |
|---|---|---|
| Prepoly (R1) |  |  |
| Residence time | [h] | 0.1 |
| Temperature | [° C.] | 30.3 |
| Loop (R2) |  |  |
| Residence time | [h] | 0.6 |
| Temperature | [° C.] | 70 |
| $H_2/C_3$ ratio | [mol/kmol] | 13.9 |
| MFR | [g/10 min] | 35 |
| XCS | [wt %] | 2.0 |
| C2 content | [mol %] | 0 |
| split | [wt %] | 32.5 |
| $1^{st}$ GPR (R3) |  |  |
| Residence time | [h] | 0.6 |
| Temperature | [° C.] | 78.4 |
| Pressure | [kPa] | 2214 |
| $H_2/C_3$ ratio | [mol/kmol] | 78 |
| MFR | [g/10 min] | 35 |
| XCS | [wt %] | 2.0 |
| C2 content | [mol %] | 0 |
| split | [wt %] | 34.5 |

TABLE 1b

Polymerization of comperative HECO CE1 (Part 2)

|  |  | CE1 |
|---|---|---|
| $2^{nd}$ GPR (R4) |  |  |
| Residence time | [h] | 0.6 |
| Temperature | [° C.] | 71 |
| Pressure | [kPa] | 2292 |
| $C_2/C_3$ ratio | [mol/kmol] | 715 |
| $H_2/C_2$ ratio | [mol/kmol] | 219 |
| MFR | [g/10 min] | 12 |
| XCS | [wt %] | 19 |
| C2 content | [mol %] | 12 |
| split | [wt %] | 21 |
| $3^{rd}$ GPR (R5) |  |  |
| Residence time | [h] | 0.6 |
| Temperature | [° C.] | 83 |
| Pressure | [kPa] | 1383 |
| $C_2/C_3$ ratio | [mol/kmol] | 747 |
| $H_2/C_2$ ratio | [mol/kmol] | 203 |
| $MFR_2$ | [g/10 min] | 13 |
| XCS | [wt %] | 30 |
| IV of XCI | [dl/g] | 1.5 |
| IV of XCS | [dl/g] | 2.2 |
| C2 of XCS | [mol %] | 47 |
| C2 content | [mol %] | 20 |
| split | [wt %] | 12 |

Polymerization of Inventive HECOs IE1 to 1E4 (Bench Scale)

Examples were accomplished in a 21.3 l autoclave equipped with control valves for dosing the reactor with monomers, hydrogen and for flashing. The dosage of monomers and hydrogen into the reactor was monitored by flow controllers and also by monitoring the mass of their respective reservoirs. The temperature of the reactors was controlled via cooling/heating of water in the double jacket around the reactors including sensors in both the top and bottom of the reactor. Helical stirrers with magnetic coupling were used for effective mixing inside the reactor and the stirring rates could be varied during the course of the reaction.

Catalyst Preparation:
Used Chemicals:
20% solution in toluene of butyl ethyl magnesium (Mg(Bu)(Et), BEM), provided by Chemtura
2-ethylhexanol, provided by Amphochem
3-Butoxy-2-propanol-(DOWANOL™ PnB), provided by Dow
bis(2-ethylhexyl)citraconate, provided by SynphaBase
$TiCl_4$, provided by Millenium Chemicals
Toluene, provided by Aspokem
Viscoplex® 1-254, provided by Evonik
Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

Polymerization
Bulk:

The reactor is initially purged with propylene and then filled with 5930 g of propylene and 3 litres of hydrogen for the pre-polymerisation. The catalyst as defined above (a suspension in a mineral oi) was mixed with a solution of TEAl and D-donor at a preset TEAl/Ti ratio of 250 mol/mol and TEAl/Donor ratio of 10 mol/mol for 5 minutes before being added to the reactor. The catalyst loading vessel is then flushed with 250 g propylene to ensure all of the catalyst mixture is added to the reactor. The reactor then undergoes pre-polymerisation at 30° C. for 6 minutes while stirring at 350 rpm. Subsequently, the reactor is heated up to 80° C. to initiate bulk conditions. While in transition the desired amount of hydrogen is added to the reactor via a flow controller. Hydrogen is always added in bulk and not added continuously during the reaction. Once the desired reactor conditions are reached, the reactor is held at a constant pressure by dosing with propylene. This transition time to reach the bulk conditions was typically ~19 minutes. After the specified bulk residence time, the reactor is purged to 0.5 barg with a stirring speed of 100 rpm to continue to a gas phase step.

GPR1

Once the desired purge pressure (0.5 barg) was achieved, the transition to the EPR gas phase (GPR1) began. The stirring rate of the reactor was increased to 200 rpm and the reactor was dosed with propylene, ethylene and hydrogen as the temperature and pressure were increased to 80° C. and 25 barg, respectively. The transition time between the Bulk and the GPR1 was typically between 8 to 10 minutes. The comonomers were added to maintain a desired gas ratio. Once the reactor reached the desired temperature, the pressure was held constant at the desired level by dosing with ethylene/propylene at the appropriate gas ratio. The amount of polymer being produced could be monitored by measuring the amount of propylene and ethylene added during the course of the reaction. After a desired split level was reached, the reactor followed the termination procedure outlined below.

Reaction Termination:

After the reaction is completed the stirring speed is reduced to 100 rpm and the gas mixture purged from the reactor to 0 barg. Residual gases are removed from the reactor by treating the reactor with several nitrogen/vacuum cycles. This cycle involves putting the reactor under vacuum for several minutes, filling up to ambient pressures with nitrogen and then repeating the process several times. The product is then safely removed from the reactor.

Post Reactor Treatment

All polymer powders were blended with 0.05 wt % calcium stearate and 0.20 wt % Songnox 11B FF using a twin-screw extruder TSE16TC. The calcium stearate and Songnox 11B are standard antioxidant agents used for stabilizing the polymer powder. During the compounding the following temperature profile was set: 190, 210, 230, 210° C.

The analytics of the prepared samples can be gathered from Tables 2 and 3, IE1 to 1E4.

TABLE 2

Polymerization of inventive HECOs IE1 to IE4

|  |  | IE1 | IE2 | IE3 | IE4 |
|---|---|---|---|---|---|
| Bulk |  |  |  |  |  |
| Residence time | [h] | 0.5 | 0.5 | 0.5 | 0.5 |
| split | [wt.-%] | 50.4 | 64.4 | 64.3 | 55.1 |
| MFR | [g/10 min] | 45 | 68 | 45 | 92 |
| C2 | [mol-%] | 0 | 0 | 0 | 0 |
| XCS | [wt.-%] | 2.0 | 2.0 | 2.0 | 2.0 |
| $H_2$ in liquid | [mol-%] | 0.74 | 1.07 | 0.74 | 1.40 |
| GPR |  |  |  |  |  |
| Residence time | [h] | 1.3 | 0.5 | 0.6 | 1.0 |
| Split | [wt.-%] | 49.6 | 35.7 | 35.7 | 44.9 |
| C2/(C2 + C3) | [mol/mol] | 0.40 | 0.55 | 0.71 | 0.70 |
| H2/C2 | [mol/kmol] | 410 | 215 | 298 | 318 |
| Final |  |  |  |  |  |
| MFR, total | [g/10 min] | 31 | 26 | 20 | 32 |
| C2 total | [mol-%] | 30.7 | 30.5 | 35.7 | 47.6 |
| XCS | [wt.-%] | 49 | 35.0 | 30.8 | 37.0 |
| C2/XCS | [mol-%] | 48.1 | 61.9 | 66.9 | 72.5 |
| IV/XCI | [dl/g] | 1.40 | 1.27 | 1.40 | 1.19 |
| IV/XCS | [dl/g] | 1.32 | 1.71 | 1.38 | 1.62 |

TABLE 3

Properties

|  |  | IE1 | IE2 | IE3 | IE4 | CE1 |
|---|---|---|---|---|---|---|
| MFR | [g/10 min] | 31 | 26 | 20 | 32 | 13 |
| SHif | [%] | 0.00 | 0.21 | 0.06 | 0.17 | 0.79 |
| SHaf | [%] | 0.24 | 0.58 | 0.00 | 0.41 | 0.92 |
| FM | [MPa] | 410 | 813 | 831 | 718 | 790 |
| CHI(23) | [kJ/m$^2$] | 49 | 17 | 10 | 21 | 35 |
| CHI(−20) | [kJ/m$^2$] | 54 | 7 | 4 | 9 | 7 |
| CLTE23 | [μm/mK] | 58 | 98 | 88 | 84 | 110 |
| CLTE-30 | [μm/mK] | 62 | 88 | 80 | 80 | 96 |

SHif Shrinkage in flow
SHaf Shrinkage across flow
FM Flexural Modulus
CHI(23) Charpy impact strength at 23° C.
CHI(−20) Charpy impact strength at −20° C.
CLTE23 CLTE +23/80° C./MD
CLTE-30 CLTE −30/80° C./MD

The invention claimed is:

1. An automotive article comprising at least 60 wt. % of a heterophasic propylene copolymer (HECO) having comonomers being ethylene and/or a $C_4$ to $C_8$ α-olefin, and comprising:
   (a) a (semi)crystalline polypropylene (PP) having a melt flow rate $MFR_2$ (230° C.) measured according to ISO 1133 in the range of 40 to 120 g/10 min; and
   (b) an elastomeric propylene copolymer (ESC) dispersed in said (semi)crystalline polypropylene (PP);
   wherein said heterophasic propylene copolymer (HECO) has:
   (i) a xylene cold soluble (XCS) fraction in the range of 22 to 64 wt. %;
   (ii) a comonomer content in the range of 30.0 to 75.0 mol %;
   (iii) a melt flow rate $MFR_2$ (230° C.) measured according to ISO 1133 in the range of 15 to 70 g/10 min; and
   (iv) a xylene cold insoluble (XCI) fraction;
   wherein further the intrinsic viscosity (IV) of the xylene cold soluble (XCS) fraction of said heterophasic propylene copolymer (HECO) is in the range of 1.30 to 2.20 dl/g; and
   wherein the intrinsic viscosity (IV) of the xylene cold insoluble (XCI) fraction of the heterophasic propylene copolymer (HECO) is in the range of 1.05 to 1.45 dl/g.

2. The automotive article according to claim 1, wherein the xylene cold soluble (XCS) fraction of the heterophasic propylene copolymer (HECO) has a comonomer content in the range of 40.0 to 75.0 mol %.

3. The automotive article according to claim 1, wherein the comonomers of the heterophasic propylene copolymer (HECO) are ethylene and/or the comonomers of the xylene cold soluble (XCS) fraction of the heterophasic propylene copolymer (HECO) are ethylene.

4. The automotive article according to claim 1, wherein:
   (a) the xylene cold soluble (XCS) fraction of the heterophasic propylene copolymer (HECO) has an intrinsic viscosity (IV) in the range of 1.30 to 2.00 dl/g, and/or
   (b) the heterophasic propylene copolymer (HECO) complies with the in-equation (2):

$$0.90 \leq \frac{IV\ (XCS)}{IV\ (XCI)} \leq 2.00 \qquad (2)$$

wherein;
- IV (XCS) is the intrinsic viscosity (IV) [dl/g] of the xylene cold soluble (XCS) fraction of the heterophasic propylene copolymer (HECO), and
- IV (XCI) is the intrinsic viscosity (IV) [dl/g] of the xylene cold insoluble (XCI) fraction of the heterophasic propylene copolymer (HECO).

5. The automotive article according to claim 1 wherein the heterophasic propylene copolymer (HECO) complies with the in equation (1):

$$\frac{C2\ (XCS)}{C2\ (T)} \leq 2.5 \quad (1)$$

wherein;
C2 (XCS) is the comonomer content of the xylene cold soluble (XCS) fraction; and
C2 (T) is the comonomer content of heterophasic propylene copolymer (HECO).

6. The automotive article according to claim 1, wherein the heterophasic propylene copolymer (HECO) complies with the in-equation (3):

$$\frac{MFR\ (M)}{MFR\ (T)} \leq 5.0 \quad (3)$$

wherein;
MFR (M) is the melt flow rate $MFR_2$ (230° C.) measured according to ISO 1133 (g/10 min) of the (semi)crystalline polypropylene (PP); and
MFR (T) is the melt flow rate $MFR_2$ (230° C.) measured according to ISO 1133 (g/10 min) of the heterophasic propylene copolymer (HECO).

7. The automotive article according to claim 1, wherein the (semi)crystalline polypropylene (PP) is a (semi)crystalline propylene homopolymer (H-PP) having a xylene cold soluble (XCS) fraction of less than 4.5 wt. %.

8. The automotive article according to claim 1, wherein the elastomeric propylene copolymer (ESC) is an ethylene propylene rubber (EPR).

9. The automotive article according to claim 1, wherein the heterophasic propylene copolymer (HECO) has:
(a) impact strength at +23° C. of at least 10 kJ/m²; and/or
(b) a coefficient of linear thermal expansion (CLTE) performed in a temperature range from −30 to +80° C. of not more than 92 μm/mK.

10. The automotive article according to claim 1, wherein the heterophasic propylene copolymer (HECO) has:
(a) a shrinkage in flow (60×60×2 mm) of below 0.50%, and/or
(b) a shrinkage across flow (60×60×2 mm) of below 0.70%.

11. The automotive article according to claim 1, wherein the automotive article is an exterior automotive article.

\* \* \* \* \*